May 12, 1942. J. C. GIBBS 2,282,959
MACHINE FOR MAKING CLOSURE CAPS
Filed Oct. 12, 1937 12 Sheets-Sheet 1
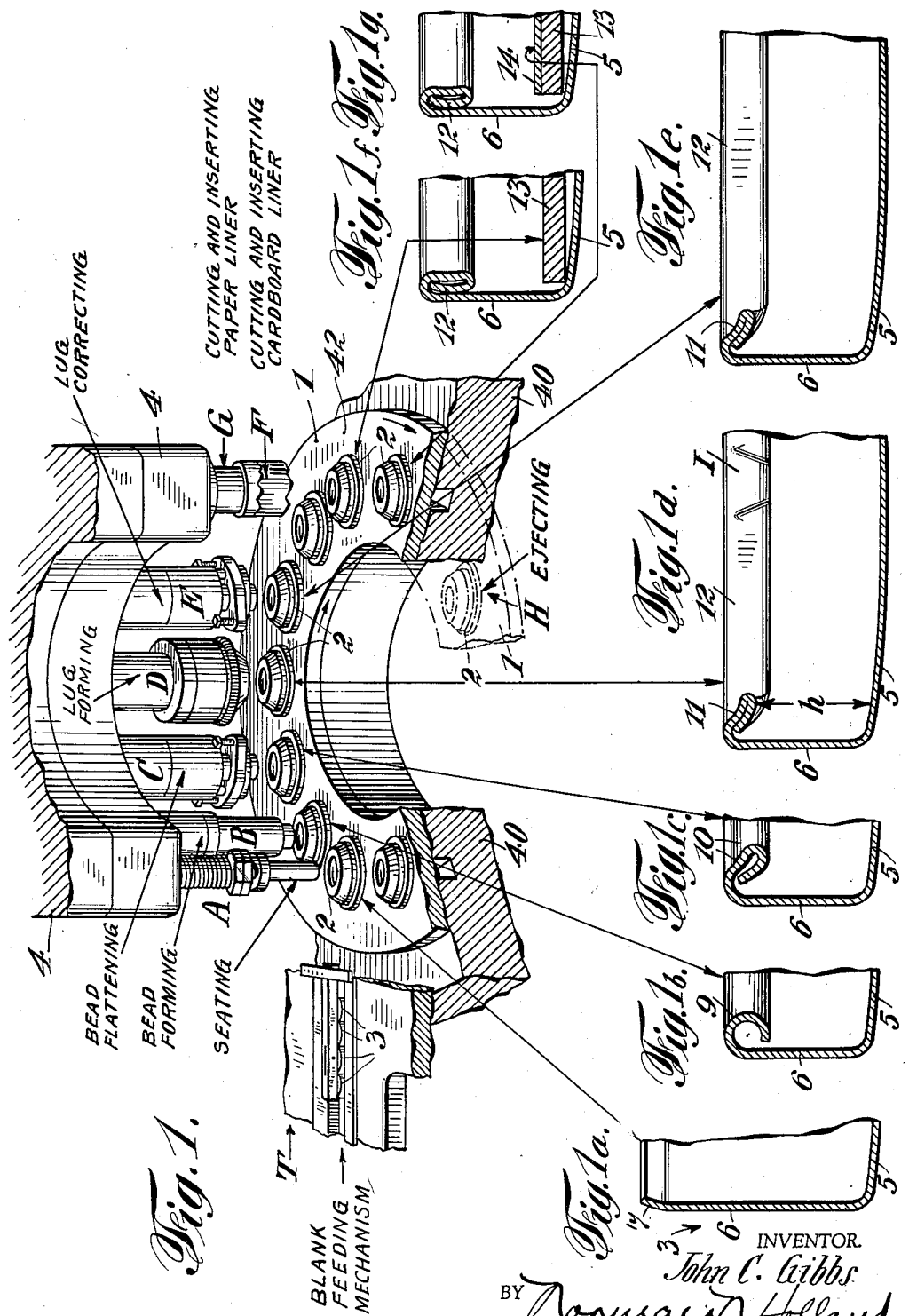
INVENTOR.
John C. Gibbs
BY Norman N. Holland
his ATTORNEY.

May 12, 1942. J. C. GIBBS 2,282,959
MACHINE FOR MAKING CLOSURE CAPS
Filed Oct. 12, 1937 12 Sheets-Sheet 2
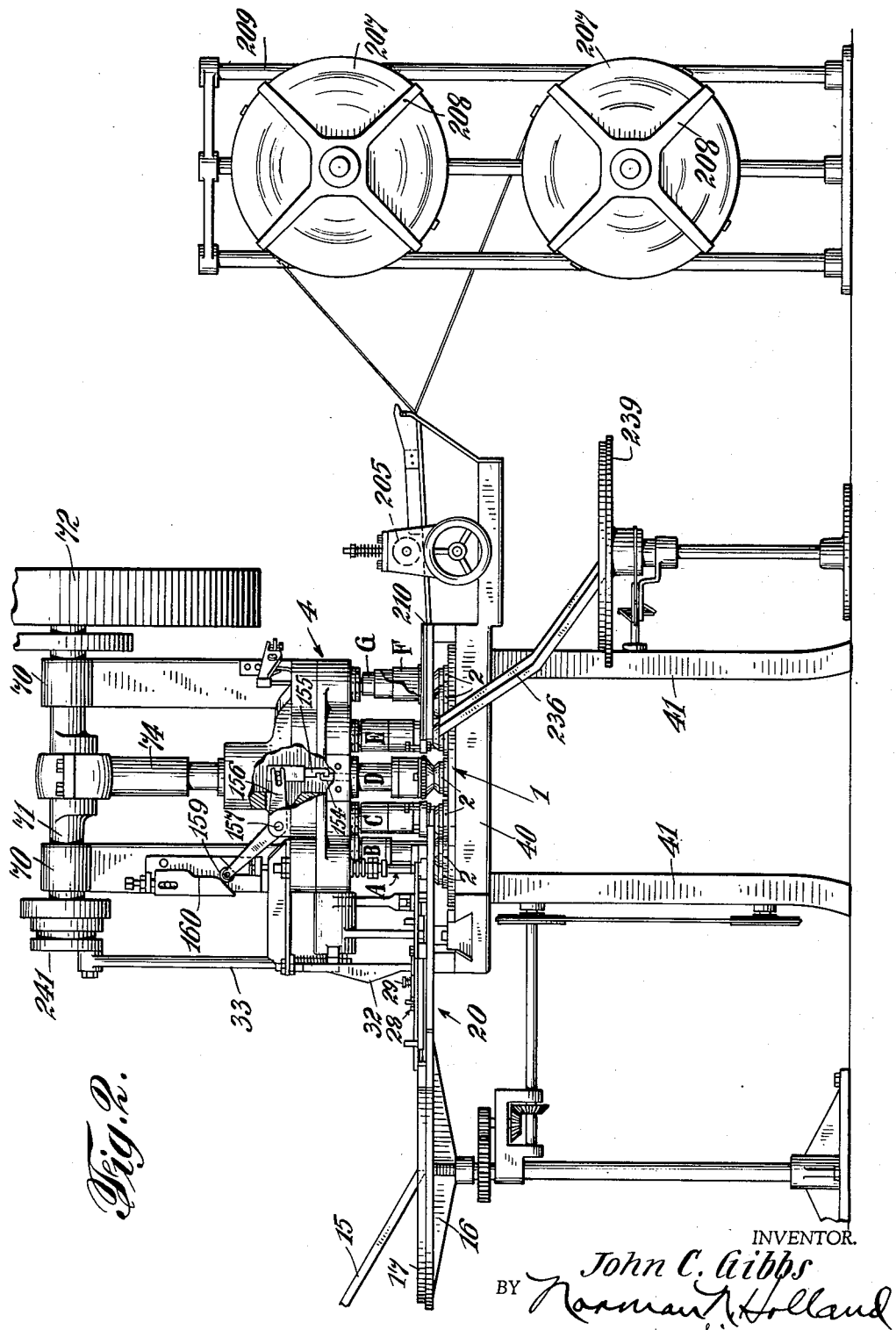
INVENTOR.
John C. Gibbs
BY Norman N. Holland
his ATTORNEY.

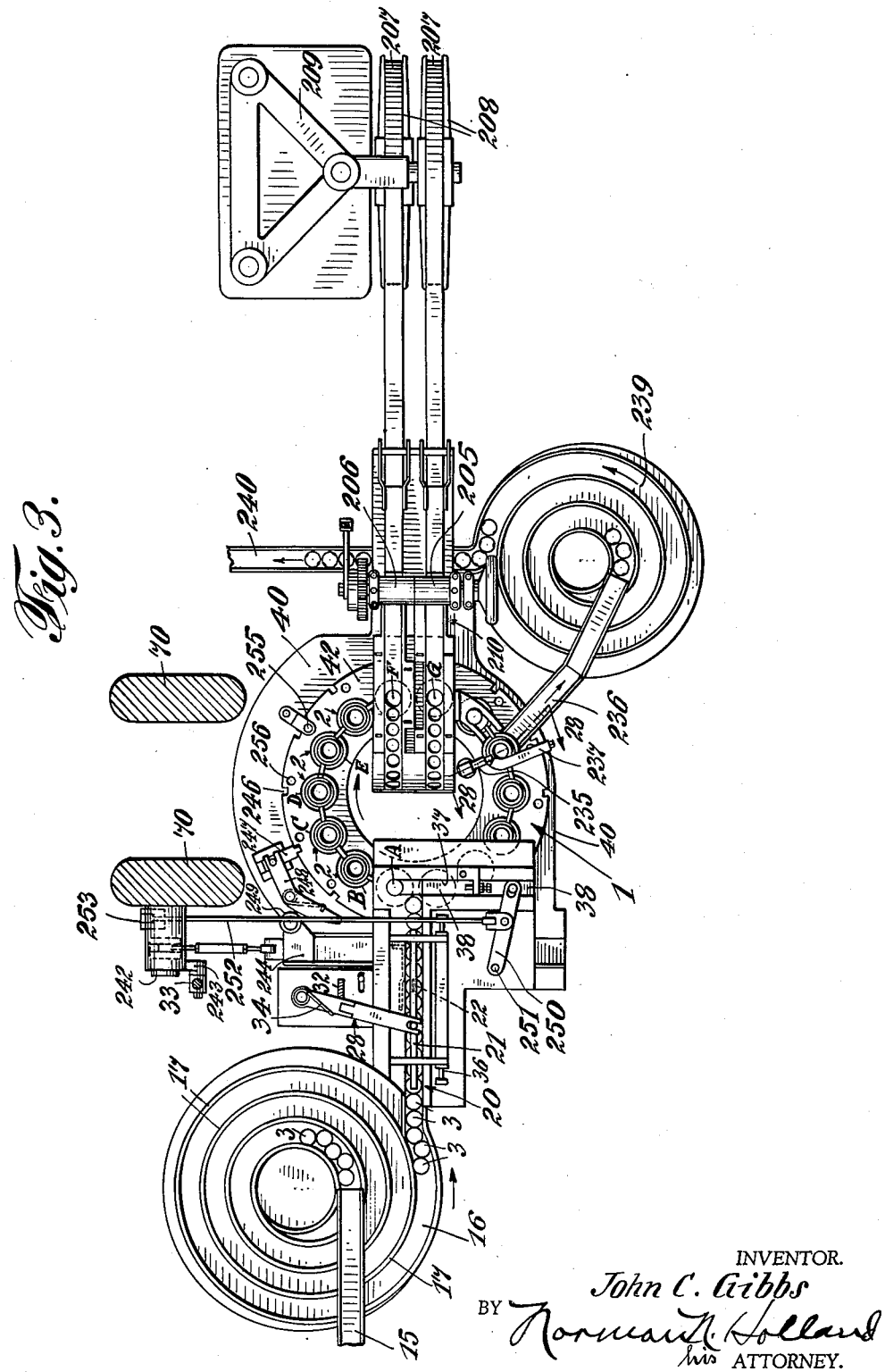

May 12, 1942.  J. C. GIBBS  2,282,959
MACHINE FOR MAKING CLOSURE CAPS
Filed Oct. 12, 1937  12 Sheets-Sheet 4
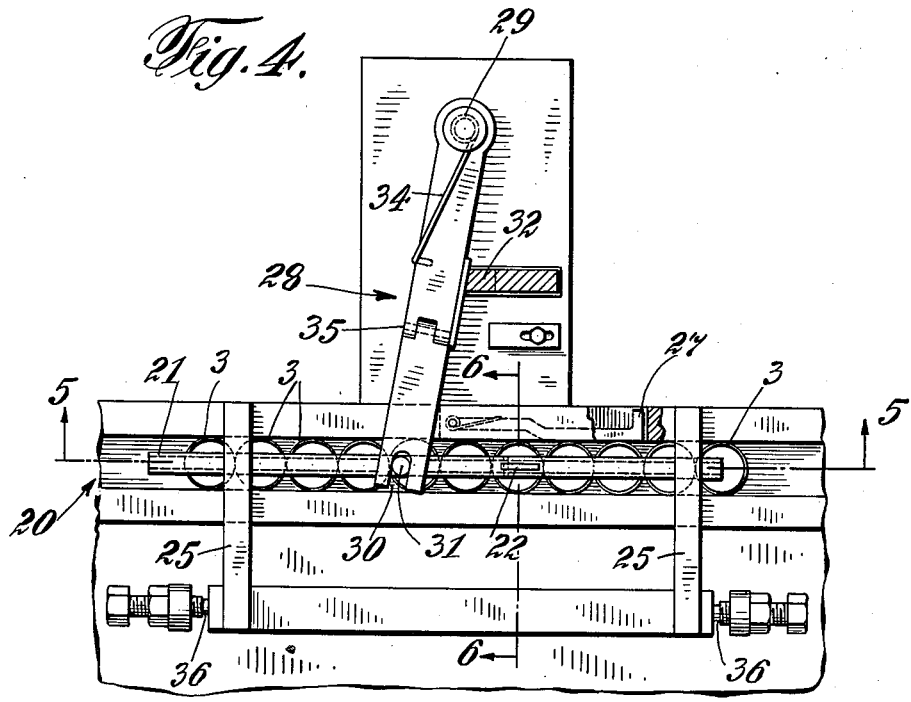
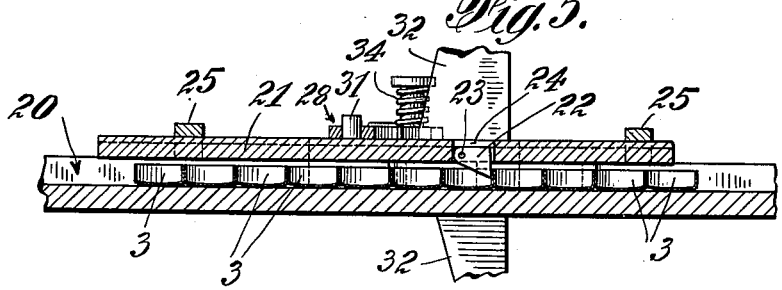
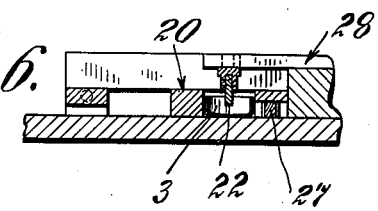
INVENTOR.
John C. Gibbs
BY Norman N. Holland
his ATTORNEY.

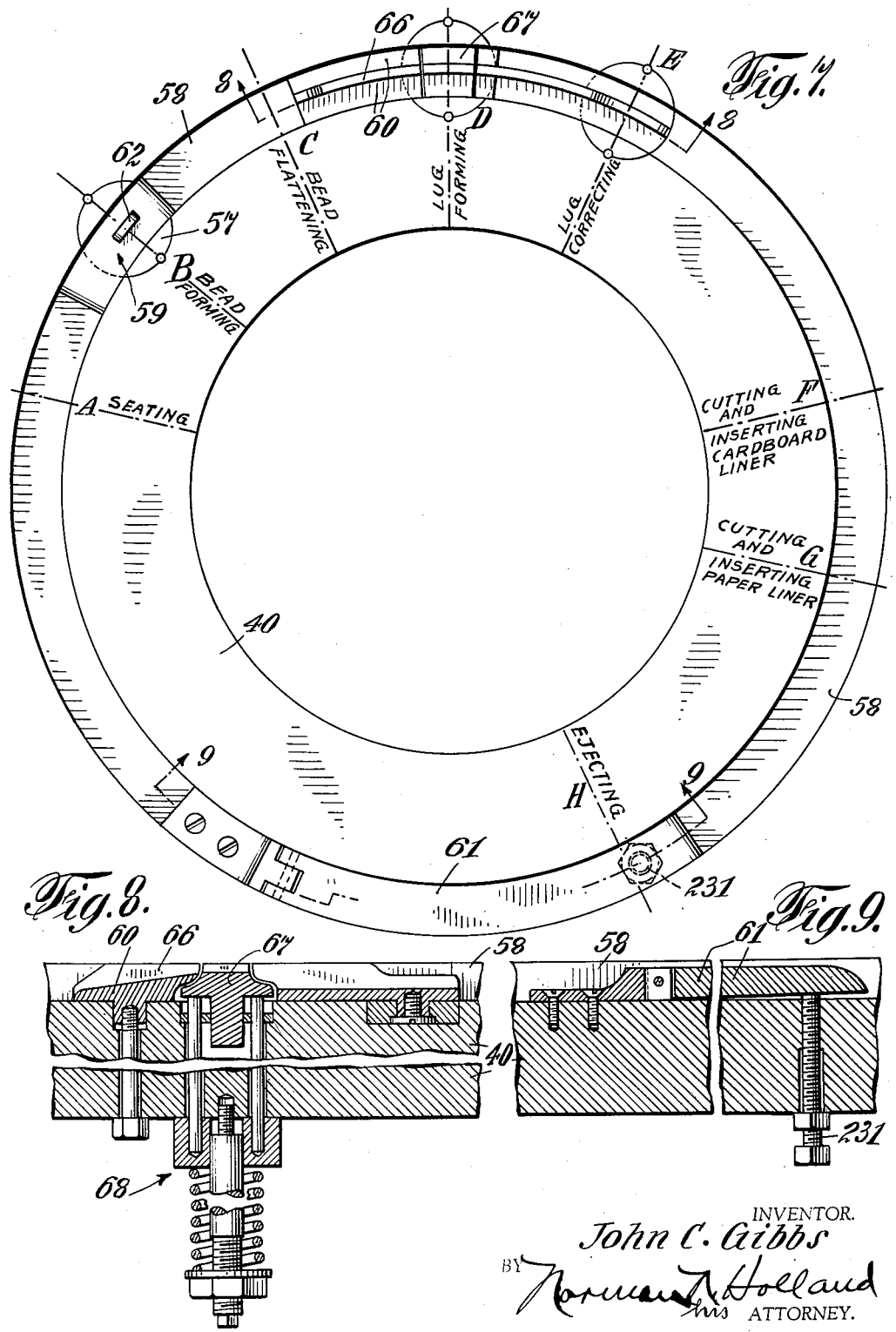

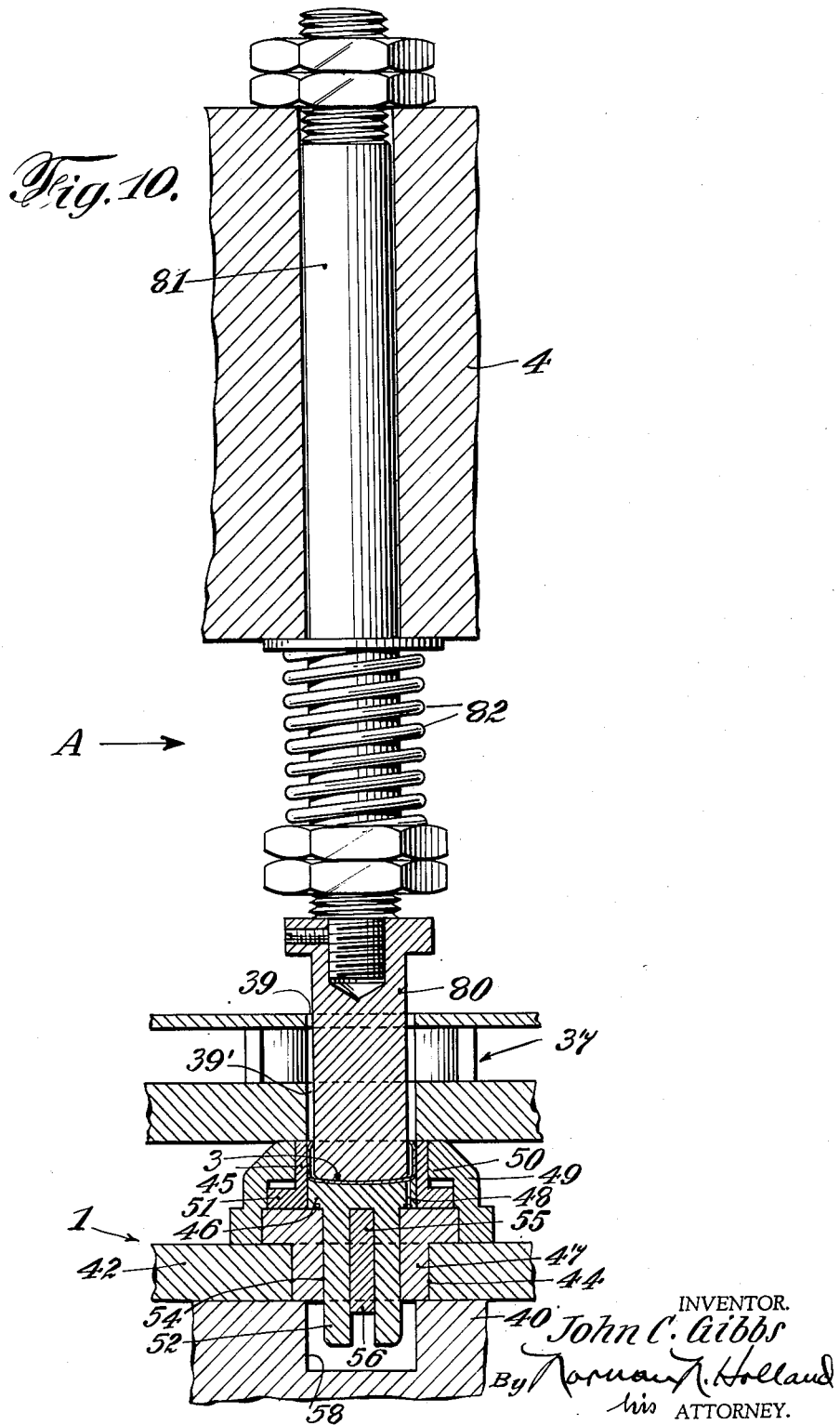

May 12, 1942.  J. C. GIBBS  2,282,959
MACHINE FOR MAKING CLOSURE CAPS
Filed Oct. 12, 1937  12 Sheets-Sheet 7
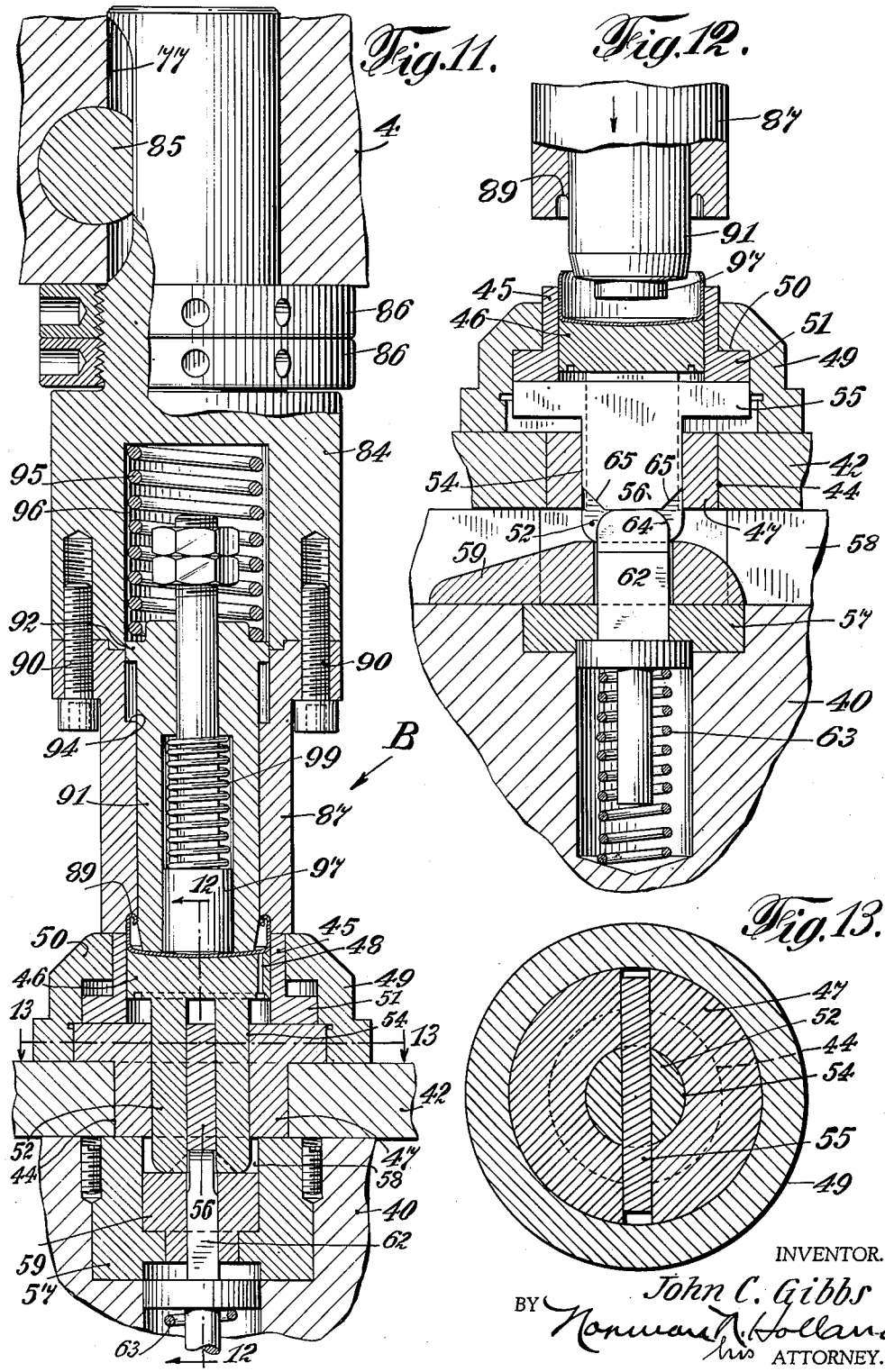
INVENTOR.
John C. Gibbs
BY Norman N. Holland
his ATTORNEY.

May 12, 1942.   J. C. GIBBS   2,282,959
MACHINE FOR MAKING CLOSURE CAPS
Filed Oct. 12, 1937   12 Sheets-Sheet 8
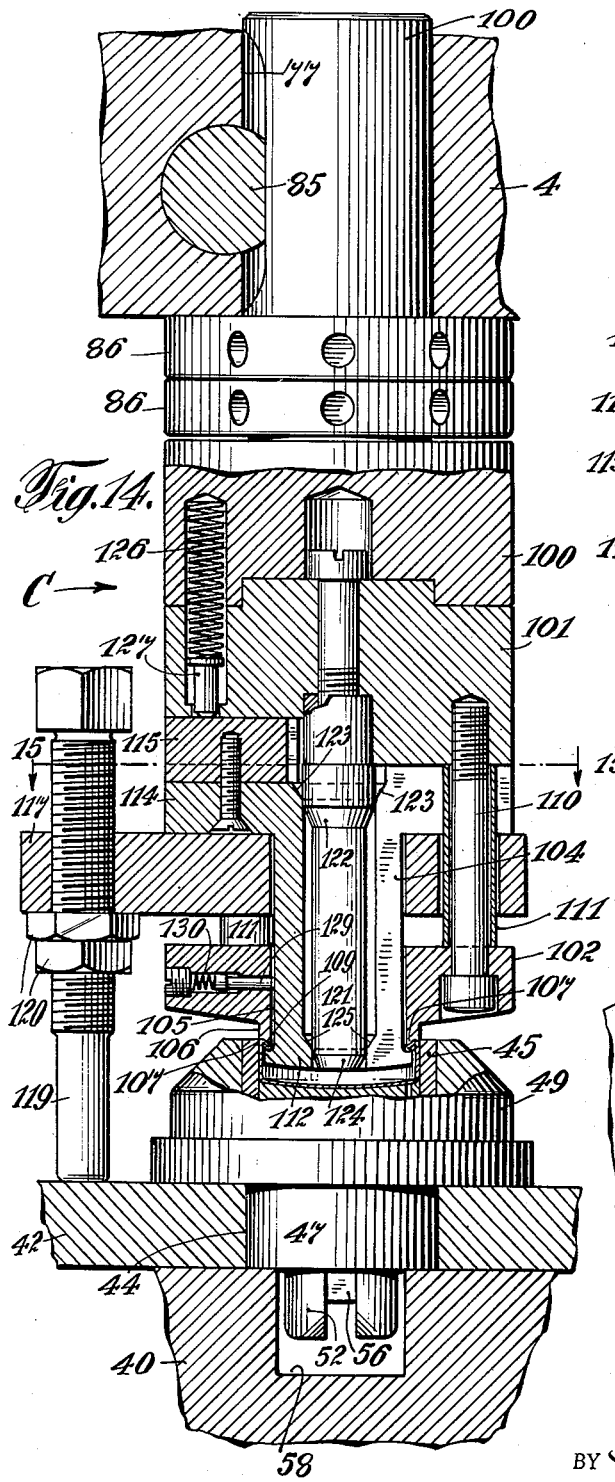
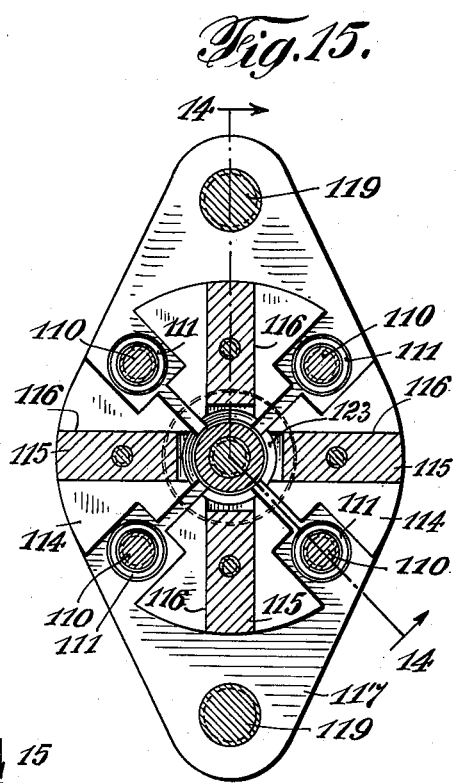
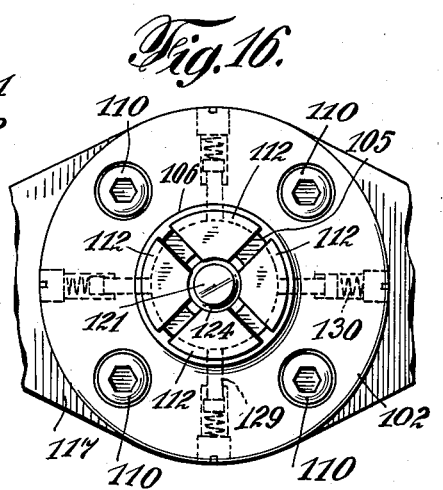
INVENTOR.
John C. Gibbs
BY Norman N. Holland
his ATTORNEY.

May 12, 1942. J. C. GIBBS 2,282,959
MACHINE FOR MAKING CLOSURE CAPS
Filed Oct. 12, 1937 12 Sheets-Sheet 9
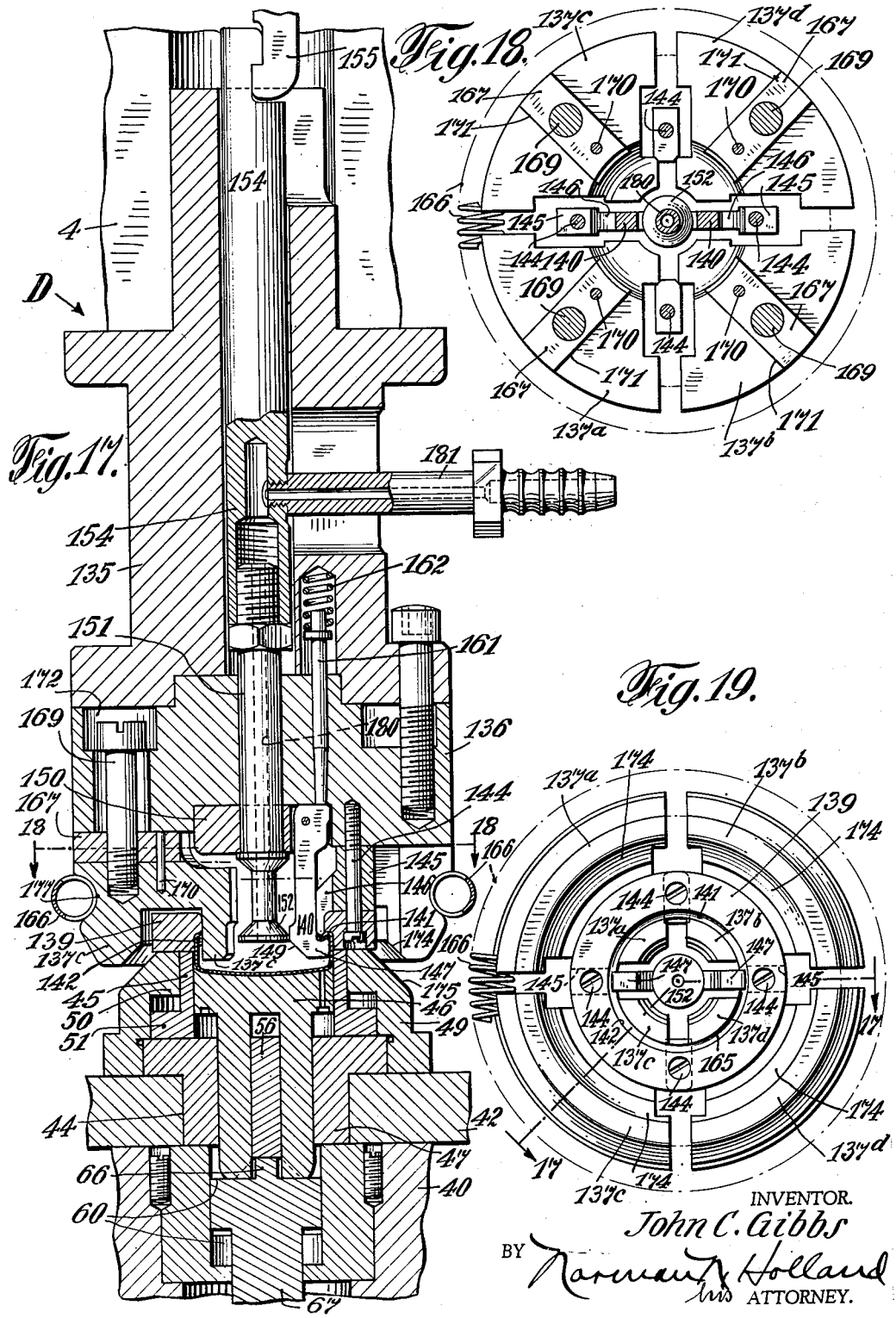
INVENTOR.
John C. Gibbs
BY Norman N. Holland
his ATTORNEY.

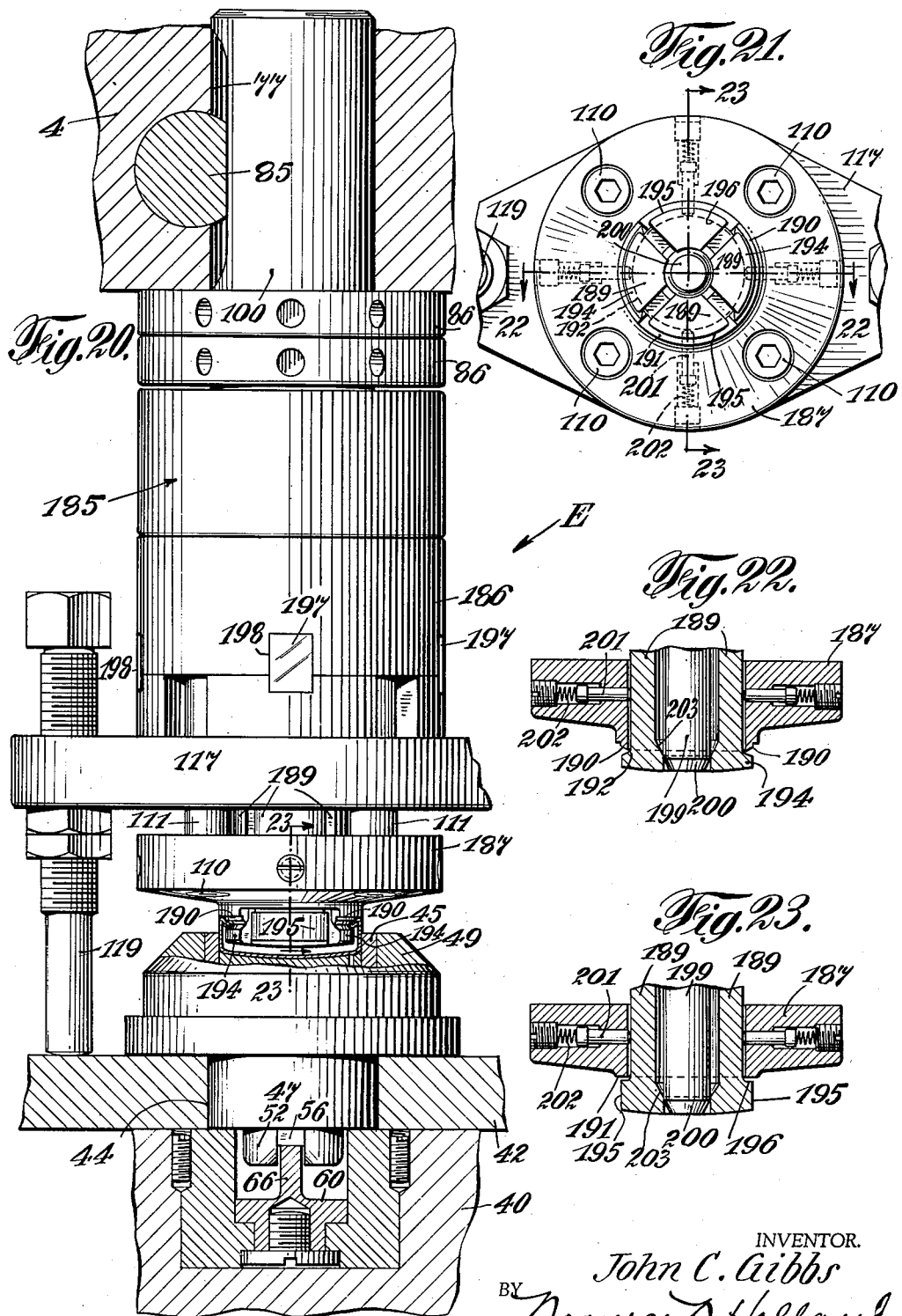

May 12, 1942.    J. C. GIBBS    2,282,959
MACHINE FOR MAKING CLOSURE CAPS
Filed Oct. 12, 1937    12 Sheets-Sheet 11
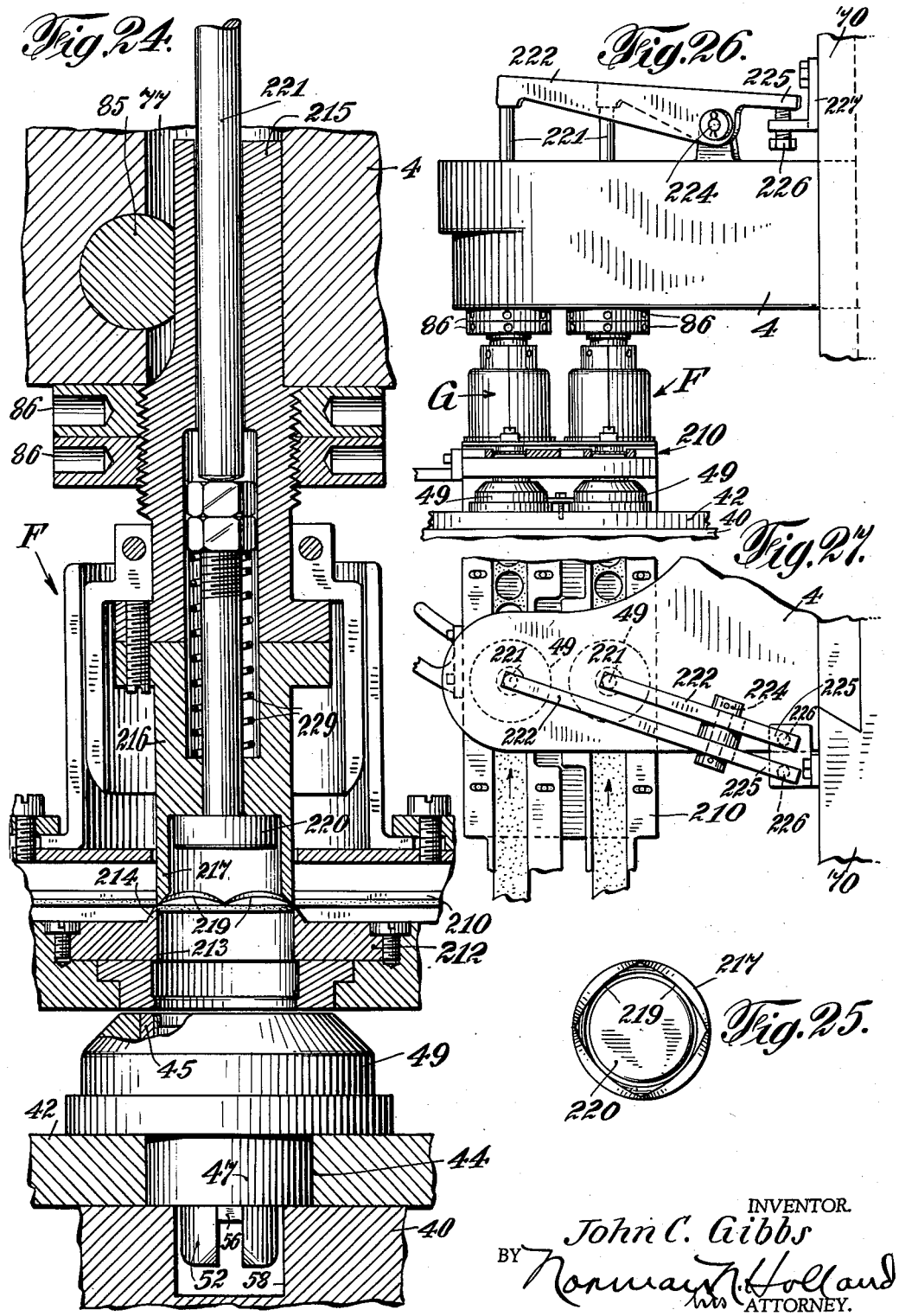
INVENTOR.
John C. Gibbs
BY Norman H. Holland
his ATTORNEY.

May 12, 1942.  J. C. GIBBS  2,282,959
MACHINE FOR MAKING CLOSURE CAPS
Filed Oct. 12, 1937    12 Sheets-Sheet 12
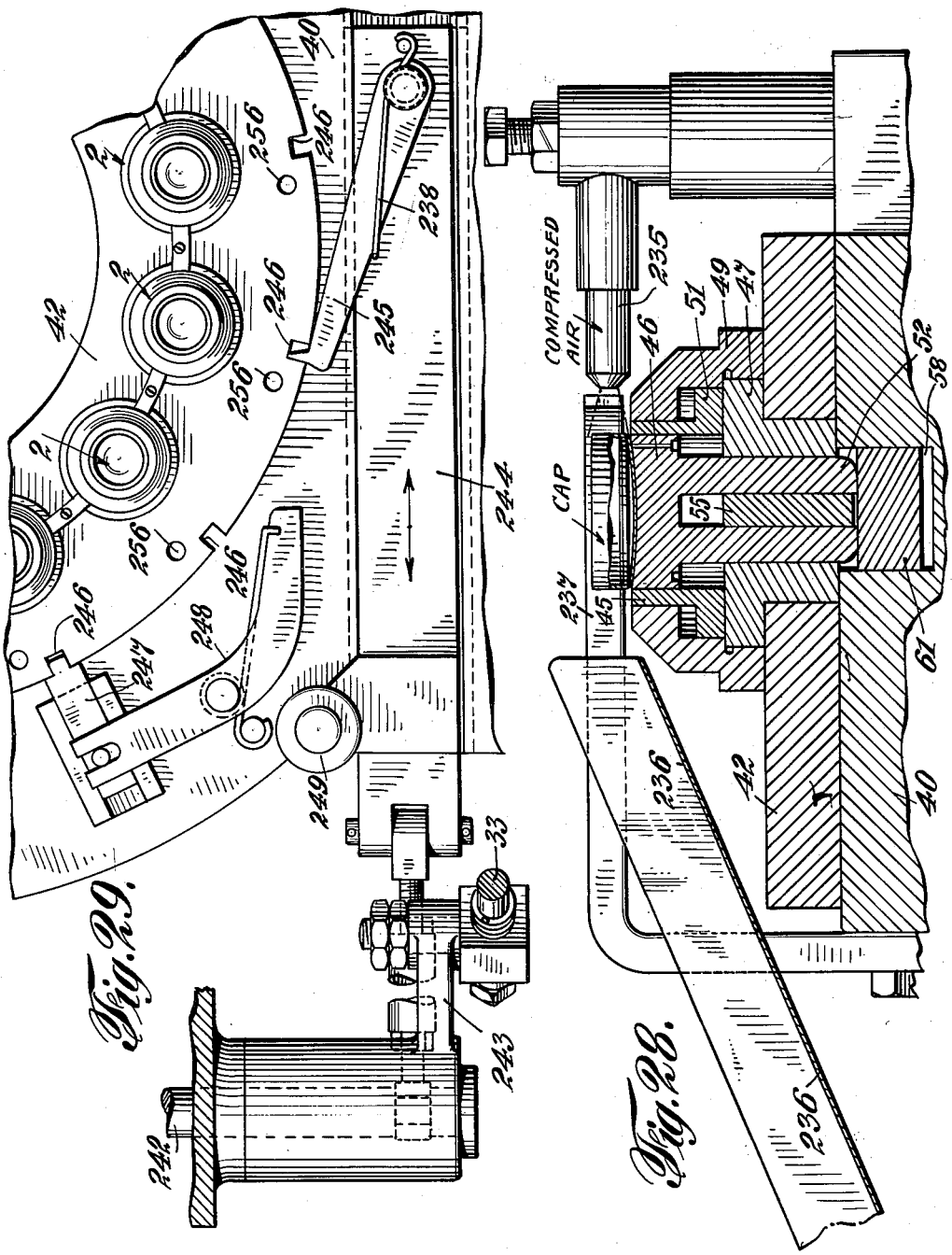
INVENTOR.
John C. Gibbs
BY Norman H. Holland
his ATTORNEY.

Patented May 12, 1942

2,282,959

UNITED STATES PATENT OFFICE 2,282,959

MACHINE FOR MAKING CLOSURE CAPS

John C. Gibbs, Brooklyn, N. Y., assignor to Anchor Cap & Closure Corporation, Long Island City, N. Y., a corporation of New York Application October 12, 1937, Serial No. 168,536

26 Claims. (Cl. 113—1)

The present invention relates to a machine for making closure caps and more particularly to a machine for making screw closure caps having concealed container engaging means.

Screw closure caps having an inturned bead or wire edge wherein container engaging lugs or thread projections are formed are very popular because the threads or lugs are not visible from the exterior of the caps and the caps have the appearance of more expensive caps formed of plastic molding compounds. A very popular cap of the above type is illustrated in my copending application, Serial No. 9,642, filed March 6, 1935, now Patent 2,089,954.

The present invention aims to provide an improved cap forming machine for making closures of the above type in a simple and inexpensive manner. The machine is designed to fabricate caps at a relatively high rate of speed without subjecting the material from which the caps are formed to severe bending strains or damaging the lacquer or decorative coating of the material. Also, the machine is capable of forming caps conforming to a prescribed standard so that the caps are substantially uniform and properly fit the thread finish of the containers to form a secure seal in every instance. The present machine accomplishes this by accurately maintaining the distance between the upper surface of the threads or lugs and the cover part of the cap within a permissive range of tolerances and by maintaining the skirt of the cap circular and of uniform length throughout its circumference. Also, the machine forms caps which are free from irregularities or exposed edges of metal which might scratch the glass containers and weaken the threads thereon.

An object of the present invention is to provide an improved cap forming machine primarily adapted for making closure caps having concealed lugs or threads in the skirt thereof.

Another object of the invention is to provide an improved means effective progressively to form concealed lugs or threads in the skirt of a blank.

Another object of the invention is to provide an intermittently rotated table having suitable sockets for holding the blanks in predetermined positions while the lug forming means are effective.

Another object of the invention is to provide a machine for manufacturing screw closure caps from lacquered or coated sheet metal or the like, which subjects the cap to a minimum amount of bending strains and does not mar the lacquer or coating.

Another object of the invention is to provide a machine adapted to form closure caps having concealed threads or lugs constructed to give maximum strength.

Another object of the invention is to provide a machine for manufacturing closure caps adapted to form a substantially smooth circular flattened inturned bead at the lower part of the skirt of the cap having concealed lugs at spaced intervals.

Another object of the invention is to provide a machine adapted to form closure caps which conform to a predetermined standard and are adapted to fit the sealing finish of the containers and form a secure seal in every instance.

Another object of the invention is to provide a device and method for adjusting the position of the container engaging portions of the caps and eliminating irregularities at the lower portion of the skirt during the manufacture of the caps.

Another object of the invention is to provide an improved machine which is automatic in operation, requiring minimum amount of manual supervision.

Another object of the invention is to provide an improved machine having tools for forming closure caps which are readily removed and replaced by tools for forming closure caps of another size.

Another object of the invention is to provide a machine adapted to form an inturned hollow bead in the skirt of a blank, flatten the bead, form lugs in the bead, correct the position of the lugs, and insert a sealing liner to produce a finished cap.

A further object of the invention consists in the combination of elements and arrangements of parts adapted to achieve the objects enumerated above.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a diagrammatic perspective view of an intermittently rotatable table and a press carrying a series of tools for progressively forming suitable blanks into closure caps;

Fig. 1a is a fragmentary sectional view of a blank adapted to be fabricated into a closure cap;

Fig. 1b is a fragmentary sectional view showing the blank after a bead has been formed in the skirt thereof;

Fig. 1c is a fragmentary sectional view showing the blank after the bead has been flattened;

Fig. 1d is a fragmentary sectional view showing the blank after lugs or container engaging projections have been formed from the bead to provide a closure cap;

Fig. 1e is a fragmentary sectional view showing the cap after the position of the lugs has been gauged or corrected;

Fig. 1f is a fragmentary sectional view showing the cap having a cardboard liner or the like inserted therein;

Fig. 1g is a fragmentary sectional view showing the cap having a sealing liner or the like inserted therein.

Fig. 2 is a front elevational view of a machine illustrating a preferred embodiment of the invention;

Fig. 3 is a top plan view of the machine shown in Fig. 2 with the press omitted for clearness;

Fig. 4 is a top plan view illustrating a preferred embodiment of a device for feeding blanks to sockets of the dial table of the machine;

Fig. 5 is a sectional view taken along the line 5—5 of Fig. 4;

Fig. 6 is a sectional view taken along the line 6—6 of Fig. 4;

Fig. 7 is a top plan view of a cam for raising the sockets while the blanks are being shaped by the cap forming devices;

Fig. 8 is a sectional view taken along the line 8—8 of Fig. 7;

Fig. 9 is a sectional view taken along the line 9—9 of Fig. 7;

Fig. 10 is an enlarged view illustrating a device for seating the blanks in the sockets carried by the dial table;

Fig. 11 is an enlarged sectional view, illustrating a device for forming an inturned bead in the skirt of the blank;

Fig. 12 is a sectional view taken along the line 12—12 of Fig. 11 showing the device in another position;

Fig. 13 is a sectional view taken along the line 13—13 of Fig. 11;

Fig. 14 is an enlarged staggered sectional view taken along the line 14—14 of Fig. 15 illustrating a device for flattening the bead;

Fig. 15 is a sectional view taken along the line 15—15 of Fig. 14;

Fig. 16 is a bottom view of the bead flattening device illustrated in Fig. 14;

Fig. 17 is an enlarged staggered sectional view taken along the line 17—17 of Fig. 19 illustrating a device for forming container engaging lugs in the bead;

Fig. 18 is a sectional view taken along the line 18—18 of Fig. 17;

Fig. 19 is a bottom view of the device illustrated in Fig. 17;

Fig. 20 is a side elevational view, partly in section, of a device for correcting the position of the lugs;

Fig. 21 is a bottom view of the device illustrated in Fig. 20;

Fig. 22 is a sectional view taken along the line 22—22 of Fig. 21;

Fig. 23 is a sectional view taken along the line 23—23 of Fig. 21;

Fig. 24 is an enlarged sectional view illustrating a device for cutting sealing liners and inserting them into the closure caps;

Fig. 25 is a bottom view of the cutting device illustrated in Fig. 24;

Fig. 26 is a side elevational view of the liner cutting device illustrated in Fig. 24 and a mechanism for operating the device;

Fig. 27 is a top plan view illustrating the mechanism for operating the liner cutting device;

Fig. 28 is a sectional view of a device for removing the finished caps from the dial table; and Fig. 29 is a fragmentary top plan view of a mechanism for intermittently rotating the table step by step.

Described generally, the machine (Fig. 1) comprises an intermittently rotatable dial table 1 or the like having a circularly arranged series of sockets or matrices 2 thereon for receiving blanks 3 formed of lacquered sheet metal or the like, and a suitable press having a head 4 for supporting a series of tools A, B, C, D, E, F and G adapted to progressively form the blanks into closure caps provided with concealed lugs or threads (Fig. 1g).

The blanks (Fig. 1a) preferably comprise a cover portion 5 and a depending flange or skirt 6 having its free edge 7 bent slightly inwardly to facilitate the formation of an inturned bead and lugs in the manner about to be described. The blanks are delivered to the dial table 1 by a suitable feeding or transferring device T and are pushed downwardly and seated in the sockets 2 by a plunger A or the like, with the free edge 7 of the skirt facing upwardly. The table is then rotated to move the blank underneath a tool B adapted to form a substantially circular hollow inturned bead 9 (Fig. 1b) which is flattened (Fig. 1c) at the next station by a tool C and is set inwardly at an acute angle with respect to the skirt. Preferably, the tool C also forms an annular depression 10 in the bead adjacent the edge of the skirt to facilitate bending of the flattened bead at succeeding stations of the press. After the table has been rotated again, the blank is moved to a tool D which is adapted to form suitable lugs 11 (Fig. 1d) from the bead and fold the portions of the bead 12 intermediate the lugs against the skirt. At the next station, a tool E engages the lugs and adjusts their position with respect to the cover part (Fig. 1e). The tool E also flattens the intermediate bead portions 12 to eliminate irregularities I (Fig. 1d) and makes the skirt uniformly circular. The cap is then delivered to a tool F adapted to cut a cardboard liner 13 or the like (Fig. 1f) and insert it in the cap and is thereafter delivered to a similar liner cutting tool G adapted to insert an oil paper sealing liner 14 or the like (Fig. 1g). The completed caps may be removed from the table by a suitable ejecting device at H and thereafter cleaned, counted and packed for shipment.

The blank feeding devices

Referring again to the drawings and more particularly to Figs. 2 and 3, there is shown a chute 15 adapted to receive blanks from a blank forming machine and deliver them to a rotatable platform or table 16 substantially at the middle thereof. A spiral guideway 17 is mounted above the platform 16 adapted to keep a reserve supply of blanks on the platform and deliver them to the cap forming machine.

A suitable mechanism, illustrated in Figs. 3, 4, 5, 6 and 10 may be utilized for delivering cap blanks along a guideway 20 extending from the spiral 17 to the dial table 1. The mechanism comprises a longitudinally reciprocating member 21, a pawl 22 pivotally mounted in a recess 24 at 23 for engaging the skirt of a blank, and suitable transversely extending members 25 for supporting the reciprocating member 21. When the reciprocating member 21 is moved toward the dial table, the pawl 22 advances a row of blanks and when moved in the opposite direction, the pawl is moved upwardly into the recess 24 and at the end of the stroke the pawl drops downwardly to engage the succeeding blank. To prevent the row of blanks from moving too freely while in the guideway 20, a resiliently mounted retarding arm or wiper 27 preferably forms a portion of the guideway at one side thereof.

The slidable member 21 preferably is reciprocated by an oscillating arm 28 pivotally mounted at 29 and having a notch or recess 30 adapted to receive a projection 31 or connecting member on the slidable member. Preferably, the arm 28 is adapted to be moved in one direction by a cam 32 mounted on a rod 33 (Fig. 2) operatively connected to the press, as will be described hereafter, and is adapted to be moved in the other direction by a suitable spring 34 or the like (Fig. 4).

If desired, the arm 28 may be hinged at 35 or foldably connected with respect to its pivot 29 to permit it to be raised upwardly to disconnect the recess 30 and projection 31 and stop movement of the slidable member 21 without stopping operation of the press. Also, the transversely extending members 25 for mounting the slidable member 21 may be hinged at 36 to raise the slidable member upwardly from the guideway and facilitate access to the guideway in the event that blanks become jammed therein.

In Figs. 3 and 10 a suitable device is illustrated adapted to cooperate with the reciprocating feeding member 21 to place the blanks one at a time into the sockets 2 on the dial table. This device preferably comprises a guideway 37 extending transversely with respect to the blank guideway 20 for receiving the foremost blank and a slidable member 38 adapted to advance the foremost blank into a position directly above the socket at the blank inserting station. In order to enable the plunger A to insert the blank (Fig. 10), the top and bottom of the guideway 37 have apertures 39 and 39'. When the press is lowered, the plunger extends through the aperture 39, engages the blank, moves it through aperture 39' and inserts it into the socket.

The slidable member 38 is adapted to be reciprocated in the guideway at desired intervals by suitable connecting means which will be described in connection with the drive mechanism.

The intermittently rotated table

The rotatable table or dial 1 is shown more particularly in Figs. 2, 3, 10, 11, 12, 13 and 29 and preferably comprises a bed-plate or platform 40 supported by a suitable frame or base 41 (Fig. 2) adapted to be secured to the floor, and a substantially annular dial member 42 rotatably mounted on the platform adapted to be rotated intermittently by a suitable mechanism, which will be described hereafter (Fig. 29). The annular member 42 is provided with a series of circularly arranged apertures 44 (Fig. 10) having socket or matrix members mounted therein adapted to receive the blanks 3. Any suitable number of sockets may be utilized depending upon the diameter of the annular member and the size of the caps to be formed, and if desired, the sockets may be attached in a manner to permit them to be interchanged for sockets adapted to accommodate other size blanks.

The sockets or dies (Figs. 10 and 11) preferably comprise a slidable sleeve member 45 adapted to form the side wall of the socket, a member 46 slidable with respect to the sleeve member 45 adapted to form the bottom of the socket, a bushing member 47 seated in an aperture 44 of the table adapted to support the side and bottom members 45 and 46, and a casing member 49 secured to the bushing member 47 having an inwardly extending flange 50 at its upper end adapted to cooperate with a flange 51 on the sleeve member 45 to limit upward movement of the members 45 and 46 within the casing member 49. To prevent the formation of air pockets in the sockets when the blanks are inserted tending to unseat the blanks, the bottom members may be provided with one or more venting apertures 48 (Fig. 10).

Preferably, the bottom member 46 has a bifurcated or slotted downwardly depending portion 52 adapted to extend through an aperture 54 in the bushing member 47 to permit the members 46 to be raised by a cam device or the like about to be described. The sleeve member 45 may be raised independently of the bottom member by a radially extending member 55 mounted in the slotted portion having a depending portion 56 adapted to engage a cam surface or the like (Figs. 11, 12 and 13).

In order to raise the sleeve and bottom members of the sockets while certain steps are performed by the tools of the press, a cam track 57 or the like is provided in a groove 58 in the bed-plate 40 beneath the intermittently rotated annular dial member 42 (Figs. 7, 8 and 9). The cam track preferably comprises a cam portion 59 for engaging the depending portion 52 of the bottom member 46 to raise the bottom member 46 at the bead forming station (Figs. 7 and 12) so that the free edge of the skirt of the blank projects upwardly from the socket and may be engaged by the bead forming tool, and similar cam portions 60 (Fig. 8) and 61 (Fig. 9) for raising the blank at the lug forming station and the finished cap at the ejecting station.

The sleeve members 45 of the sockets may be raised upwardly independently of the bottom members 46 at the bead curling and lug forming stations by suitable cam means. To accomplish this at the curling or bead forming station, a resiliently mounted anvil member 62 (Fig. 12) supported by a spring 63 extends upwardly through the cam portion 59 and is provided with a cam surface 64 adapted to engage a cam surface 65 on the depending portion 56 of the member 55. The resilient mounting permits the curling tool to engage the sleeve member 45 and push it downwardly without subjecting the curling sleeve and socket parts to excessive strains.

The sleeve members 45 may be raised or resiliently supported in a similar manner at the lug forming station by a cam portion 66 (Fig. 8) projecting upwardly at the middle of the cam portion 60. The cam portion 66 is adapted to engage the depending portion 56 and extend into the slotted depending portion 52 of the bottom member 46. In this manner, the cam portions 60 and 66 cooperate with the depending portions 52 and 56 (Figs. 17 and 20) in engagement therewith, and prevent the bottom members and sleeve from turning with respect to the socket casing 49. Preferably, the cam portion 66 fitting into the slotted depending portion 52 extends from the lug forming station to the lug correcting station so that the blank cannot rotate in the socket while transferred from one station to the other. Consequently, the lugs formed from the bead of the blank are properly positioned with respect to the lug correcting tools and the blank need not be oriented before the lug correcting tools are applied. The bottom and sleeve members of the socket may be supported in raised position by an anvil member 67 (Figs. 8 and 17) which is a continuation of the cam portions 60 and 66. This anvil member is mounted on an adjustable resilient device 68 adapted to yield when the cam is forced downwardly by the lug forming device to prevent the tools from applying excessive forces or distorting the blank. A more detailed description of the cam portions and their operation will be given in connection with the description of the respective stations at which they are effective.

The press machine

The press mechanism is illustrated more particularly in Fig. 2 and preferably comprises a pair of upright columns 70 mounted on the base or frame 41, a crank shaft 71 extending through bearings at the upper end of the columns, a flywheel 72 at one end of the crank shaft and a connecting rod 74 for reciprocating the press head 4 carrying the various cap forming tools. If desired, the press head may also carry a suitable mechanism for intermittently rotating the table while the crank shaft may be provided with an eccentric mechanism for operating the blank feeding devices. These mechanisms will be described in detail in connection with the drive means for operating the machine.

The press head preferably is substantially U-shaped or semi-circular (Fig. 1) and has suitable apertures 77 therein spaced circumferentially for mounting the tools above the table in vertical alignment with the stations at which the sockets are positioned. Reading from left to right (Fig. 2) the tools illustrated herein comprise a device A for inserting and seating the blanks 3 in the sockets, a device B for forming a substantially hollow bead in the skirt 1 of the blanks (Fig. 1b), a device C for flattening the bead (Fig. 1c), a device D for setting portions of the flattened bead inwardly to provide container engaging lugs (Fig. 1d), a device E for correcting the position of the lugs with respect to the cover portion of the blank (Fig. 1e), and devices F and G for cutting and inserting sealing liners in the caps (Figs. 1f and 1g). By moving the press head downwardly, each of the tools is effective to simultaneously perform its respective operation upon a cap blank delivered by the sockets on the dial table. After downward movement of the press head, the table is rotated a predetermined distance to advance the blanks to the succeeding tools so that the blanks are progressively formed into closure caps. The various tools carried by the press are illustrated more particularly in Figs 10 to 27 and each will now be described in detail.

The blank inserting device

Referring more particularly to Fig. 10 there is shown a suitable device A adapted to cooperate with the cap feeding devices to insert a blank 3 into a socket on the table. This device preferably comprises a plunger or plug 80 slightly smaller in diameter than the blank, a rod 81 supporting the plunger 80 slidably mounted on the press head 4, and a resilient member such as a spring 82 for normally holding the rod downwardly but adapted to yield to permit the rod to move slightly upwardly when the plunger seats the blank in the socket. The plunger is adapted to be inserted into the skirt of the blank and engage the underside of the cover portion to properly position the blank in the socket so that succeeding operations performed upon the blank by the cap forming tools are uniform in every instance. By reason of the resilient mounting, the plunger will not mar or distort the caps when they are placed into the socket, and the venting aperture 48 eliminates compression of air in the sockets tending to unseat the blanks. Preferably, the plunger is attached to the rod in such a manner that it can be easily removed and replaced by plungers for inserting blanks of other shapes or sizes.

The device for forming the hollow bead

A suitable device B adapted to form a substantially hollow bead 9 (Fig. 1b) in the skirt of the blank is illustrated more particularly in Figs. 11, 12 and 13. This device is mounted on the press head adjacent the blank seating device A by a connecting member 84 having a portion extending into an aperture 77 of the press head and secured thereto by a key 85 or the like. The height of the device A with respect to the table may be adjusted by a pair of threaded collars 86 or the like, attached to the connecting member below the press head.

In order to bend the free edge of the blanks into a hollow bead 9, a tubular sleeve 87 having a curling groove 89 (Fig. 12) adjacent its lower end is attached to the lower end of the connecting member by suitable bolts 90 or the like, and a plunger 91 having a tapered lower end is slidably mounted within the sleeve 87 adapted to be inserted into the skirt of the blank and hold the blank against the bottom member 46 of the socket. The plunger is provided with a flange 92 adapted to cooperate with a shoulder 94 on the inner walls of the sleeve 87 to limit the downward movement of the plunger and a suitable spring 95 mounted in a socket 96 in the connecting member 84 engages the flange 92 to urge the plunger downwardly.

When the blanks are delivered to this tool, the bottom member 46 of the socket is raised upwardly by the cam portion 59 (Figs. 11 and 12) and is held in elevated position so that the free edge of the skirt of the blank projects upwardly from the socket. The sleeve member 45 forming the side walls of the socket is raised independently by the cam surface 64 of the resiliently mounted anvil member 62 adapted to hold the sleeve in elevated position so that the upper end of the sleeve member 45 extends above the socket casing 49 (Fig. 12). In this manner, when the press head moves downwardly, the plunger 91 holds the blank against the bottom member 46 and the lower end of the curling sleeve 87 engages the upper end of the sleeve member 45 of the socket to form a closed casing about the upper end of the skirt of the blank. As the curling sleeve 87 is moved further downwardly, the free edge of the skirt of the blank is bent into a substantially hollow bead 9 by the curling groove 89 (Fig. 11), and the sleeve member 45 is moved downwardly by the sleeve 87 in opposition to the spring 63 supporting the anvil member 62. During the curling operation, the sleeves 45 and 87 form a closed casing or sleeve about the outer wall of the skirt of the blank (Fig. 11) which prevents the skirt from being bent out-of-round or distorted. Also, maximum downward movement of the curling sleeve 87 is attained without engaging or exerting excessive strains on the socket casings 49. In the event that the curling sleeve and casing engage the spring supporting the anvil 62 and the spring 95 for urging the curling sleeve downwardly provide a cushioning effect.

When the press head is moved upwardly the plunger 91 holds the blank in the socket while the curling sleeve 87 moves upwardly and upon further upward movement of the press, the plunger 91 is withdrawn from the blank. In order to prevent the blank from being raised by the plunger 91 or shifted in the socket, an auxiliary plunger 97 is slidably mounted within the plunger 91 which is adapted to be urged downwardly by a spring 99 to hold the blank in the socket while the plunger 91 is raised. During downward movement of the press and engagement of the blank by the plunger 91, the auxiliary plunger 97 assists in holding the blank downwardly in the socket. After the press head is raised to withdraw the curling sleeve and plungers 91 and 97, the table is rotated again to deliver the blank to the succeeding tool.

The bead flattening device

A preferred device C for flattening the hollow bead and setting it at an acute angle with respect to the skirt of the blank (Fig. 1c) is illustrated more particularly in Figs. 14, 15 and 16. This device may be mounted on the press head in a similar manner as the bead curling device and comprises a mounting member 100 and a collar member 101 secured to the mounting member for supporting a substantially annular member 102 adapted to engage the upper part of the bead (Fig. 14) and for supporting expandible jaw members 104 adapted to engage and flatten the bead upwardly against the annular member 102.

The annular member 102 preferably has an aperture 105 therein through which the jaw members 104 extend, and an annular depending portion 106 extending downwardly from the inner periphery thereof for engaging the bead. This depending portion may have an inwardly and downwardly tapered surface 107 which determines the angle at which the bead is set inwardly with respect to the skirt of the blank. Preferably, an annular projection 109 is provided on the tapered surface adapted to form the annular groove 10 (Figs. 1c and 14) or depression in the flattened bead which facilitates setting the flattened bead inwardly against the skirt of the blank without causing iregularities at the lower edge of the blank where the bead is folded with respect to the skirt. The annular member may be connected to the mounting member by bolts 110 or the like and may be spaced therefrom by sleeves or tubular members 111 extending about the bolts. Any number of bolts and sleeves may be utilized, for example, four, as illustrated herein.

The jaw members for engaging the underside of the bead preferably are provided with an outwardly extending circular segments 112 (Fig. 16) which cooperate to engage the underside of the bead 9 and press the bead upwardly against the tapered surface 107 of the annular portion 106. Any suitable number of jaw members may be utilized, for example, four, so that the four segments provide a circular flange for engaging the bead.

The jaw members may be operatively mounted in any suitable manner but preferably are provided with extensions 114 at the upper end thereof adapted to be secured to a key member 115 slidably mounted in slots or groove 116 (Figs. 14 and 15) in the collar member 101. The slidable key members are adapted to move radially inwardly and outwardly in the slots as well as upwardly and downwardly.

Upward movement of the key members and the jaws preferably is effected by slidably mounting a flange member 117 on the sleeves 111 having bolts 119 or the like threaded therein which, upon downward movement of the press, engage the dial 42 (Fig. 14) and move the flange member 117 upwardly to cause the upper surface of the flange to engage the extensions 114 on the jaw members 104 and move the jar members upwardly to flatten the bead. The distance the bolts 119 are spaced from the table may be adjusted by suitable lock nuts 120 or the like threaded to the bolts. This adjustment determines the distance the jaw members are moved upwardly when the bolts engage the table.

The jaw members preferably are moved radially outwardly after the bead collapsing segments 112 have been inserted into the blank, by a rod 121 or the like secured to the collar member 101 having a cam surface 122 for engaging cam surfaces 123 substantially at the upper end of the jaw members and a cam surface 124 for engaging cam surfaces 125 substantially at the lower end of the jaw members. These cam surfaces are positioned so that the jaw members are expanded after they are inserted past the bead 9. By providing a cam surface at the upper end and the lower end of the jaw members, the jaw members are moved outwardly horizontally and are not tilted out of effective flattening position. Also, upon upward movement, the cooperating cam surfaces maintain the jaw members in their expanded position so that they are effective to flatten the bead upwardly without forming irregularities in the bead. When the press head is moved upwardly, the flange member 117 slides downwardly on the sleeves and releases upward pressure on the extensions 114 of the jaw members to permit them to move downwardly with respect to the collar member. To insure downward movement of the jaws, spring members 126 are mounted in the collar member which urge slidably mounted members 127 downwardly against the extensions 114 of the jaw members (Fig. 14, left side). Also, during upward movement of the press, the rod 121 provided with the cam portions 122 and 124 moves upwardly out of expanding position to permit the expandible jaw members to be moved radially inwardly by slidable members 129 mounted in the annular member 102 which are urged inwardly by spring members 130 or the like. Preferably, inward movement of the jaws is effected prior to relative upward movement of the jaws with respect to the blank so that the blank is not withdrawn from the socket by the segments 112 extending under the bead of the blank.

The bead is now adapted to be provided with container engaging lugs at the succeeding station of the machine.

The lug forming device

A preferred device D for forming container engaging lugs or projections 11 (Fig. 1d) is illustrated more particularly in Figs. 17, 18 and 19. This device is mounted on the press head 4 and comprises a mounting sleeve 135 having a collar member 136 attached thereto for supporting jaw members 137a, 137b, 137c and 137d adapted to flatten the bead outwardly against the interior of the skirt of the blank, an annular member 139 for engaging the exterior of the skirt of the blank while the jaw members are effective, and expandible fingers 140 for engaging portions of the bead and forming lugs therefrom. This device is adapted to form any desired number of lugs, for example, two, three, four or six, but for illustrative purposes shown herein adapted to form jaw members and fingers are two diametrically positioned lugs.

The annular member 139 preferably has a downwardly facing groove 141 at the inner periphery thereof and a substantially vertical inner wall 142 portion adapted to engage the rounded lower edge and the exterior of the skirt, respectively (Fig. 17), to maintain the circular contour of the skirt during the flattening of the bead and to prevent the edge of the skirt from being distorted. The annular member may be secured to the mounting collar by suitable screws or bolts 144 and may be spaced therefrom by members 145 having downwardly projecting portions 146 provided with a shaping surface adapted to engage the upwardly facing surface of the bead 9 and cooperate with the fingers 140 to shape the lugs 11. When the press is lowered, the annular member engages the sleeve member 45 of the sockets which has been elevated by the cam portion 66, and cooperates therewith to encase the skirt of the cap and prevent distortion thereof during the formation of the lugs. The spring mounting 68 (Fig. 8) permits downward movement of the sleeve 45 when engaged by the downwardly moving annular member.

The lug forming fingers 140 preferably have a hook-shaped portion 147 adapted to extend outwardly beneath the closed bead and fold the bead against the depending portions 146 and have cam portions 149 at the inner radial side thereof. The fingers are pivotally mounted at the upper ends thereof on a collar 150 extending about a rod 151 slidably mounted in the mounting sleeve 135 and collar 136 and are adapted to be expanded by a cam member 152, secured to the lower end of the rod, which engages the cam surfaces 149 of the fingers upon upward movement of the rods. The rod preferably is threaded to a shaft 154 extending through the mounting sleeve 135 and preferably is adapted to be adjusted with respect to the fingers to determine the amount of outward movement of the fingers when engaged by the cam.

The shaft 154 may be raised and lowered in any suitable manner during the operation of the press, but preferably is engaged by a connecting link 155 (Fig. 17) or the like pivoted to one end of a bell crank 156 pivotally mounted on the press head at 157 (Fig. 2). The other end of the bell crank carries a roller 159 adapted to engage a cam 160 mounted on one of the press head supporting columns 70. When the press head is lowered, the cam 160 is operative to move the rod downwardly with the press head so that the cam member 152 is out of engagement with the cam portions 149 of the expandible fingers. Upon further downward movement after the hookshaped portions 147 of the lug forming fingers have been inserted into the blank, the cam 160 is effective to raise the shaft 154 and rod to cause the cam member 152 to move the fingers radially outwardly and engage portions of the bead. Further upward movement of the rod 151 causes upward movement of the collar 150 carrying the fingers so that the hook-shaped portions 147 of the fingers fold the bead against the depending portions 146 to shape the lugs. When the press head is raised, the cam member 152 moves out of engagement with the cam surfaces on the fingers and suitable plungers 161 or the like urged downwardly by springs 162 move the fingers inwardly so that they may be retracted without raising or otherwise moving the blank.

Preferably, four bead flattening jaws 137 are provided (Fig. 19) which may be in the form of expandible segments and each of the jaws has an arcuate surface 165 for engaging the portions 12 of the bead intermediate the lugs to flatten them against the skirt of the blank (Fig. 17 left side). The jaws are slidably mounted above the annular member 139 and are normally held in a collapsed position by a suitable spring member 166 or the like extending about the exterior thereof. The jaws 137 are slidably mounted with respect to the supporting collar 136 by securing them to key members 167 by suitable bolts 169 and pins 170 or the like. The key members are slidably seated in slots or recesses 171 to permit inward and outward movement of the jaws. Preferably, the bolt members extend upwardly into an enlarged recess 172 provided in the collar 136 and are slidable therein.

The bead flattening jaws or segments 137 are expanded by suitable tapered or cam-shaped surfaces 174 at the lower end thereof which engage a corresponding surface 175 on the socket casing members 40 so that the key members 167 move outwardly in the slots 171 and the arcuate portions 165 of the segments flatten the bead 9 of the blank against the skirt. While the jaws are being expanded, the sleeve member 45 of the socket cooperates with the annular member 139 to form a cylindrical casing about the skirt of the cap. When the press is raised and the surfaces 174 and 175 are out of engagement, the segments are moved inwardly by an annular spring 176 encircling the segments and retained by suitable grooves 177 formed in the segments.

In order to prevent the blank from being removed from or shifted in the socket when the lug forming device is raised upwardly, suitable means are provided for stripping the blank from the lug forming portions 146 and 147 and for holding the blank downwardly in the socket. Such means may comprise a conduit 180 extending through the rod 151 and cam member 152 and a tube 181 adapted to be connected to means for periodically supplying compressed air. It will be understood that mechanical means such as a resiliently mounted plunger, could also be utilized for this purpose.

The blank, after being subjected to the foregoing operations, is now in the form of a closure cap and will be referred to as a closure cap hereafter. The caps preferably are thereafter delivered by the dial table to a device for correcting or gauging the position of the lugs and removing irregularities in the lower edge of the skirt.

The lug correcting device

A preferred device E for correcting the position of the lugs with respect to the cover part and for removing irregularities I (Fig. 1d) in the lower portion of the skirt, is illustrated more particularly in Figs. 20, 21, 22 and 23. The lug correcting operation is important in the formation of the closure since the distance between the upper surface of the lugs and the underside of the cover part, commonly called the "h" dimension (Fig. 1e), determines the effectiveness of the container threads or projections to pull the lugs downwardly and seal the cap on the container. If this dimension is too small, the caps cannot be screwed downwardly far enough to prevent the lugs from backing off. Consequently, any excessive rotative effort exerted by the sealing machine to force the cap on the container, will cause distortion of the cap or breakage of the container. If this dimension is too large, the lugs are not pulled downwardy by the container projections to force the gasket or liner against the rim of the container and form a seal. Also, it is desirable to remove irregularities I in the bead at portions intermediate the lugs. Such irregularities are the result of utilizing expandible jaws segments for setting the bead inwardly and usually occur at the space between adjacent jaw segments, for example, 137a and 137b (Fig. 19).

The lug correcting device (Fig. 20) is mounted on the press head in substantially the same manner as the bead flattening device (Fig. 14) and comprises a mounting member 185, a collar 186 for supporting an annular member 187 adapted to engage the lower edge of the skirt of the cap, and segmental jaw members 189 adapted to correct or gauge the position of the lugs and flatten intermediate portions of the bead.

The annular member has downwardly depending portions or projections 190 (Fig. 22) adapted to engage the upwardly facing portions of the lugs to place them in a predetermined position with respect to the cover part of the cap and substantially flat horizontal portions 191 (Fig. 23) intermediate the lug engaging portions for engaging the upwardly facing lower edge of the skirt. These horizontal portions insure flattening of the skirt at all portions intermediate the lugs and provide a skirt of uniform length throughout its circumference. The annular portion is mounted in substantially the same manner as the annular portion illustrated in connection with the bead flattening device (Fig. 14) and is adapted to be moved downwardly by the mounting collar attached to the press.

Preferably, there are four segmentally arranged jaw members adapted to cooperate to engage the inner periphery of the skirt of the cap. In order to shape the lugs 11, diametrically opposite jaw members (Fig. 22) are provided with a recess 192 for receiving the lugs of the cap and outwardly extending anvil portions 194 adapted to support the thread engaging surface of the lugs while the depending portions 190 engage the lugs and set them downwardly. In this manner, the vertical position of the lugs with respect to the cover part of the cap is adjusted and at the same time the shape of the lugs is corrected.

The two diametrically opposite jaw members intermediate the jaw members for correcting the lugs are adapted to flatten the bead to remove irregularities, particularly at the points where the adjacent jaws 137 for setting the bead against the inner wall of the skirt are spaced apart (Fig. 19). To accomplish this, these jaw members (Fig. 23) are provided with a substantially vertical circular surface 195 adapted to press the bead outwardly and remove the irregularities and with substantially horizontal portions 196 adapted to support the bead while the horizontal portion 191 of the annular member 187 is effective to remove irregularities at the lower edge of the skirt. When the jaws 189 are expanded, they are also adapted to adjust the circumference of the cap both as to roundness and size.

The lug correcting jaws preferably are operated by devices similar to those for operating the bead flattening jaws (Fig. 14), for example, they may be slidably mounted on key members 197 (Fig. 20) fitting into slots 198 formed in the collar member 186 and may be expanded by a suitable pin or rod 199 having cam surfaces 200 for engaging cam portions 203 on the jaws to force the jaw outwardly. They may be returned into collapsed position by slidable members 201 urged inwardly by springs 202 or the like. They may be moved vertically with respect to the annular member 187 by a device similar to the device illustrated in connection with the bead flattening tool (Fig. 14).

During the transfer of the cap from the lug forming station to the lug correcting station, the cam portions 66 fits into the slotted depending portion 52 of the bottom member 46 of the sockets and prevents rotation of the cap within the socket. In this manner, the lugs are properly presented to the lug correcting jaws and the caps need not be oriented by any mechanism at this station. Also, while being transferred, the bottom members 46 are held in elevated position so that the free edge of the cap projects upwardly from the sleeve members 45.

The liner cutting and inserting devices

In order to expedite the manufacture of completed closure caps adapted to be sealed on containers, suitable liner cutting and inserting device F and G may be associated with the press (Figs. 1, 2, 24, 25, 26 and 27). Usually, two of these devices are provided, one F for inserting a cardboard liner 13 (Fig. 1f) and the other G for inserting an oil paper liner 14 (Fig. 1g) or the like adapted to form a seal on the rim of a container. However, if the sealing liners are made of material to perform the functions of both the cardboard and paper liner, only one of these devices is necessary. Since both of the liner cutting and inserting devices are substantially identical, only one will be described in detail.

The liner cutting and inserting devices are supplied with suitable strips of liner material by an intermittently operated feeding device comprising a pair of rollers 205 and 206 (Fig. 2) adapted to unwind rolls 207 of material on reels 208 suitably supported by a frame 209. The material is fed along a guideway 210 and across a plate 212 above the liner inserting station (Fig. 24). The plate is provided with an aperture 213 in registry with the cap in the socket at the liner inserting station and an upwardly extending annular knife edge 214 encircles the aperture which is adapted to cooperate with a cutting device about to be described.

The cutting device preferably comprises a sleeve member 215 secured to the press head 4 and a second sleeve member 216 attached to the sleeve member 215. The sleeve member 216 has a substantially annular cutting edge 217 adapted to engage the strip of material and force it against the knife edge 214 to cut a liner therefrom. In order to insure the formation of circular liners, the cutting edge 217 has inwardly and upwardly extending cutting portions 219 (Figs. 24 and 25) adapted to compensate for stretching or bending of the liner material during the cutting operation.

In order to insert the liner cut from the strip of material, a plunger 220 adapted to engage the liner and push it downwardly through the cutting aperture into the cap, is slidably mounted in the sleeves 215 and 216. The plunger preferably is operated by a slidable rod 221 adapted to be engaged by one end of a lever 222 pivotally mounted on the press head at 224 (Figs. 26 and 27) which is oscillated when the other end 225 thereof engages the stationary member on one of the press supporting columns 70. The stationary member may be a screw or bolt 226 threaded into a bracket 227 so that it may be adjusted to regulate the oscillation of the lever 222. Preferably, the inserting plunger 220 is operated at the end of the downward stroke of the press after the liners have been cut from the strip of material. Upon upward movement of the press, a suitable spring 229 retained in the sleeve 216 is adapted to return the inserting plunger 220 to its upper position.

*The cap ejecting device*

The finished closure cap may be removed from the sockets in any desired manner at the ejecting station H (Figs. 1 and 3) but preferably by raising the bottom member 46 of the sockets so that the cover part of the cap is flush with the upper surface of the socket (Fig. 28). To accomplish this, a suitable cam 61 is mounted in the cam track 57 adapted to engage the depending portions 52 to raise the bottom members upwardly (Figs. 9 and 28). This cam may be pivoted at one end thereof and may be raised and lowered by an adjustable set screw 231 or the like to determine the amount of upward movement of the bottom member 46 of the socket.

Adjacent to the cap ejecting station, suitable means may be provided for removing the cap from the socket. For example, an air nozzle 235 for periodically directing compressed air against the raised cap may be utilized. Preferably, a chute 236 (Figs. 2 and 3) is adapted to receive the caps removed from the sockets and a guard member 237 or the like is positioned adjacent to the chute for guiding the caps therein. The chute is adapted to deliver the caps to a rotating table 239 (Fig. 3) similar to the table for feeding the blanks to the machine. The table, in turn, may deliver the caps to a conveyor 240 for delivering the caps to a cleaning and counting mechanism (not shown).

*The drive mechanism*

The above described machine may be operated by any suitable driving means, for example, a motor (not shown) or the like may be operatively connected to the crank shaft 71 of the press through the intermediation of a belt or gear (Fig. 2). The crank shaft may, in turn, be provided with an eccentric 241 at one end for reciprocating the rod 33 carrying the cam 32 which operates the blank feeding devices. The press head has a suitable shaft 242 for mounting a bell crank 243 or the like adapted to be linked to a device for intermittently rotating the dial table.

The table rotating device (Fig. 29) preferably comprises a slide 244 mounted on the platform 40, a pawl member 245 pivotally mounted on the slide and a spring 238 adapted to hold the pawl in position to enter one of the ratchet recesses 246 in the dial table and impart step by step movement to the table. In order to stop the table after a predetermined amount of rotation and place the sockets in alignment with the various tools of the press, a slidable mounted plunger 247 extends into one of the recesses 246 and checks rotation of the table. The plunger is adapted to be withdrawn when the pawl mounted on the slide is moved into position to engage the succeeding recess by a pivoted lever arm 248 adapted to be oscillated by a roller 249 also mounted on the slide.

The slidable member 38, cooperating with the slidable member 21 to place the blanks one at a time in position to be inserted into the sockets by the plunger A, is reciprocated by a lever 250 (Fig. 3) pivotally mounted at 251 and adapted to be oscillated by a connecting rod 252, in turn, reciprocated by a bell crank 253 carried by the press. The bell crank 253 preferably reciprocates the rod 252 to cause the slidable member 38 to feed a blank to the inserting station upon upward movement of the press and upon downward movement of the press to place the slidable member 38 in position to engage the succeeding blank.

The liner material feeding rollers 205 and 206 may be intermittently operated by a lever or the like adapted to be operatively connected to the press and the blank feeding and cap delivering tables may be rotated by the motor through the intermediation of suitable belts and gears (Fig. 2).

*The safety devices*

A suitable safety device for preventing operation of the press unless the dial table is in proper position, may comprise a rod 255 mounted on the press (Fig. 3) adapted to extend into one of a series of apertures 256 in the dial table when the table is in proper position. In the event the rod does not enter one of the apertures, it contacts the table and operates a switch or clutch device (not shown) which stops the movement of the press to prevent the tools from damaging the dial table. During the normal operation of the dial table, the rod 255 is effective to lock the table against further rotation while the tools carried by the press head fabricate the blank into closure caps.

Safety means for positively ejecting and removing the finished caps from the sockets comprise the cam 61 for raising the bottom member 46 so that the cap is completely ejected, pneumatic means 235 for blowing the cap from the bottom member, and the guard member 237 which guides the cap to the chute 236 and prevents the caps from staying on the socket when the table is rotated.

If the blank feeding device fails to deliver a blank to a socket, the machine will not be damaged, because the tools on the press head merely operate idly in the empty socket.

The operation of the machine

When the machine is operated cap blanks having the lower edge of the flange set slightly inwardly (Fig. 1a) are delivered by the table 16 to a reciprocating feeding member 21 (Fig. 3) which cooperates with a slidable member 38 adapted to transfer a blank to the blank inserting station of the intermittently rotated dial table. While the table is at rest, the press is lowered and the plunger A (Fig. 10) inserts the blank into one of the sockets.

Upon rotation of the table, the blank is transferred to the curling tool B where the blank is raised with respect to the socket, and the sleeve 87 (Fig. 11) folds the free edge of the flange into a substantially circular hollow bead. After this operation, the table transfers the blank to a flattening tool C having an annular member 102 cooperating with jaws or segments 104 (Fig. 14) adapted to flatten the hollow bead and set it at an acute angle with respect to the skirt or flange of the blank.

When this operation is completed, the table is rotated again and transfers the blank to the lug forming tool D. At this station (Fig. 17) portions of the flattened bead are supported by expandible fingers 140 adapted to shape the lugs and suitable jaws 137a, 137b, 137c and 137d (Fig. 19) cooperate with an annular member 139 to fold portions of the bead intermediate the lugs against the inner wall of the skirt.

The cap is now completed, but preferably is subjected to a lug correcting operation to accurately determine the position of the lugs with respect to the cover part of the cap and to remove irregularities in the bead caused by the bead folding jaws 137. This operation is accomplished by the device E (Figs. 20 to 23) which comprises an annular member 187 having projections 190 for gauging the lugs and a surface 191 for straightening the lower edge of the skirt, and cooperating jaws 189 for flattening portions of the bead intermediate the lugs.

Thereafter, the cap is transferred to suitable liner cutting and inserting devices F and G which place a packing liner and a sealing liner or the like in the cap. Finally, the caps are ejected from the sockets by the cam 61 which raises the bottom 46 of the socket, and air pressure means 235 which blows the caps onto the chute 236. The caps may then be cleaned, counted and packed for shipment.

The movements of the various mechanisms are correlated as follows. When the crank shaft 71 raises the press head 4, the bell crank 243 causes the slide 244 to rotate the table. The cam 32 operates the blank feeding device 21 to deliver a blank to a guideway 37 and the slidable member 38 subsequently moves the blank into position to be inserted into a socket. The liner material feeding rollers 205 and 206 deliver strips of material to the liner cutting and inserting stations.

Upon downward movement of the press, the table locking plunger 247 and safety rod 255 insure proper positioning of the table with respect to the tools. If the rod enters one of the apertures 256, further downward movement of the press is permitted and the various tools are effective to perform their respective steps in making the cap. Also, a finished cap is removed from the ejecting station while the blank feeding member 21 is returned by the spring 34 to place it in position for feeding the next blank upon upward movement of the press. When the press moves upwardly again, the above cycle is repeated.

It will be seen that the present invention provides an improved machine for making closure caps and the like from lacquered or decorated material such as tinplate. The machine is designed to produce caps at a high rate of speed while subjecting them to a minimum amount of bending strains tending to mar the lacquer or other decorative coating. The machine is also provided with a tool for gauging the caps during their manufacture, correcting the position of the container engaging means, and removing irregularities in the skirt. This insures the formation of a secure seal in every instance when the caps are applied on containers. The cap forming tools are readily interchanged for tools adapted to form caps of other sizes and shapes or having a different number of container engaging lugs or the like. Also, the matrix members can be interchanged for other matrix members adapted to accommodate a different size blank. The safety devices reduce the amount of manual supervision required to a minimum and enables operation of the machine at high speeds without danger of damaging the parts thereof. The machine is rugged in construction and can withstand any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a machine of the class described, the combination of means for successively delivering a blank having a cover part and a flange at the outer periphery thereof to a series of tools for forming a closure cap from the blank, a press associated with said means, a tool carried by said press for forming a hollow inturned bead in the flange of the blank, a second tool carried by said press for flattening the hollow bead, a third tool carried by said press for forming container engaging lugs from the flattened bead, and a fourth tool for accurately shaping the container engaging lugs to conform to a predetermined standard and for removing irregularities in the bead.

2. In a machine of the class described, the combination of a rotatable table for presenting a circular blank having a flange at its outer periphery to tools for forming a closure cap from the blank, means for rotating said table intermittently, a press associated with said table, means on said press for providing a partially flattened inturned bead on said flange, and a tool for forming container engaging lugs from the bead and for folding portions of the bead intermediate the container engaging lugs against the inner wall of the skirt of the cap.

3. In a machine of the class described, the combination of a rotatable table for presenting a blank having a cover part and a depending flange at its outer periphery to tools for forming a closure cap from the blank, means for rotating said table intermittently, a press associated with said table, a tool carried by said press for forming a hollow inturned bead in the flange of the blank, a second tool carried by said press for flattening the hollow bead, a third tool carried by said press for forming container engaging lugs from the flattened bead, a fourth tool for accurately shaping the container engaging lugs to conform to a predetermined standard, and means associated with said press for punching a liner from strip material and carrying a member for inserting the liner in the closure cap.

4. In a machine of the class described, the combination of a rotatable table, a plurality of matrices on said table for receiving blanks, having cover parts with peripheral flanges, adapted to be formed into closure caps, means for feeding blanks to said matrices, a press associated with said table, means carried by said press for seating the blanks in said matrices, a series of tools carried by said press including a tool for forming an inturned bead, a tool for squeezing together the inturned bead in a vertical direction so as to form a flat bead, and a tool for forming container engaging screw lugs from the flattened bead.

5. In a machine of the class described, the combination of a rotatable table, a plurality of matrices on said table for receiving blanks adapted to be formed into closure caps, said blanks having cover parts with depending flanges thereon and said matrices having a movable bottom part, and a sleeve member adapted to receive the skirt of the blank, a press carrying tools for forming the flanges of the blanks into closure caps having beaded edges with spaced screw lugs, cam means beneath said table for raising the bottom part of said matrices with respect to said table, and second cam means for raising said sleeve member, and having a resiliently mounted member associated therewith and positioned beneath a forming tool adapted to permit said sleeve member to move downwardly when engaged by the forming tool.

6. In a machine of the class described, the combination of a rotatable table, a plurality of socket members on said table adapted to receive blanks having cover parts with depending flanges thereon, said socket members having a movable bottom part, a press, a tool on said press for bending a substantially hollow inturned bead in the flange of the blank, cam means for raising the bottom part of said socket member to cause the free edge of the flange to project upwardly from the socket member and be engaged by said bending tool and means carried by said press for bending said bead against the skirt of the cap at circumferentially spaced portions to form lugs from the intermediate portions thereof.

7. In a machine of the class described, the combination of a rotatable table, a plurality of socket members on said table adapted to receive blanks having cover parts and depending flanges thereon, said socket members being movable with respect to said table, a press, a tool on said press for bending a substantially hollow inturned bead in the flange of the blank, cam means for raising said socket members before the free edge of the flange is engaged by said bending tool, resiliently mounted means for holding said socket members in raised position and permitting said socket members to move downwardly gradually while said bending tool is effective and means carried by said press for bending said bead toward the skirt of the cap at circumferentially spaced portions and to form lugs from the intermediate portions thereof.

8. In a machine of the class described, the combination of a rotatable table, a plurality of socket members on said table adapted to receive blanks having cover parts with flanges thereon, said socket members being movable with respect to said table, a press, a tool on said press for bending a substantially hollow inturned bead in the flange of the blank, cam means for raising said socket members before the free edge of the flange is engaged by said bending tool, and resiliently mounted means for holding said socket members in raised position and permitting said socket members to move downwardly gradually while said bending tool is effective, and a second tool on said press for forming screw lugs from said inturned bead.

9. In a machine of the class described, the combination of means for successively presenting a blank, having a cover part and a depending flange, to a plurality of tools for forming a closure cap from the blank, a press associated with said means, a tool carried by said press for forming a hollow inturned bead in the flange of the blank, and a second tool carried by said press for moving together about the circumference of the blank in a vertical direction the upper and lower portions of said bead so as to form a substantially flat bead, comprising expandible jaws for supporting the underside of the bead substantially about its entire periphery and means for exerting pressure on the upper part of the bead toward said supporting jaws to flatten the bead.

10. In a machine of the class described, the combination of means for successively presenting a blank, having a cover part and a depending flange, to a plurality of tools for forming a closure cap from the blank, a press associated with said means, a tool carried by said press for forming a hollow inturned bead in the flange of the blank, and a second tool carried by said press for moving together about the circumference of the blank in a vertical direction the upper and lower portions of said bead so as to form a substantially flat bead, comprising pivotally mounted jaw members for supporting the underside of the bead about its periphery, means slidable with respect to said jaw members for moving said jaw members outwardly into supporting position and means slidable with respect to said jaw members for exerting pressure on the upper part of the bead to flatten the bead, thereby to facilitate setting the bead against the skirt in a succeeding operation.

11. In a machine for forming closure caps, the combination of means for successively presenting a blank, having a cover and a depending flange, to a plurality of tools for forming a closure cap from the blank, a press associated with said means, devices carried by said press for forming an inturned bead in the flange of the blank and mechanism carried by the press for flattening the bead outwardly against the skirt at circumferentially spaced portions to form screw lugs from the intermediate portions of the bead.

12. In a machine for forming closure caps, the combination of means for sucessively presenting a blank, having a cover and a depending flange, to a plurality of tools for forming a closure cap from the blank, a press associated with said means, devices carried by said press for forming an inturned bead in the flange of the blank, a tool carried by the press for moving together in a vertical direction the upper and lower parts of said bead so as to form a substantially flat bead, and mechanism carried by the press for folding the flattened bead outwardly against the skirt at circumferentially spaced portions to form screw lugs from the intermediate portions of the flattened bead.

13. In a machine of the class described, the combination of means for successively presenting a blank, having a cover portion and a depending flange, to a plurality of tools for forming a closure cap from the blank, a press for operating said tools, a tool operated by said press for forming an inturned bead in the flange of the cap, a second tool operated by said press having means adapted to flatten the bead outwardly against the skirt of the cap at circumferentially spaced intervals about the skirt and having means for supporting the underside of the bead intermediate said circumferentially spaced portions to form container lugs therefrom.

14. In a machine of the class described, the combination of means for successively presenting a blank having a cover part and a depending flange to a plurality of tools for forming a closure cap from the blank, a press associated with said means, a tool carried by said press for forming an inturned bead in the flange of the blank, a second tool operated by said press having parts adapted to engage the bead at circumferentially spaced intervals to flatten said bead outwardly against the skirt of the cap and having pivoted members adapted to extend under the bead and cooperate with said flattened parts to form container engaging lugs from the portions of the bead intermediate said circumferentially spaced flattened portions, said second tool also having resilient means for normally holding said pivoted members in collapsed position.

15. In a machine of the class described, the combination of means for successively presenting a blank having a cover part and a depending flange to a plurality of tools for forming a closure cap from the blank, a press associated with said means, a tool carried by said press for forming an inturned bead in the flange of the blank, a second tool operated by said press having members for folding portions of the edge of the bead outwardly against the inner wall of the skirt at circumferentially spaced intervals, and having pivotally mounted members adapted to engage under the portions of the bead intermediate the outwardly folded portions to form screw lugs therefrom and resilient means on said second tool for normally holding said pivotally mounted members inwardly with respect to the skirt of the cap and means for moving said pivotally mounted members outwardly under the bead of the cap.

16. In a machine of the class described, the combination of a carrier having a plurality of sockets therein for seating blanks having a cover part and a depending flange and for successively presenting said blanks to a plurality of tools for forming a closure cap therefrom, a press associated with said carrier, a tool carried by said press for forming an inturned bead in the flange of the cap, a second tool having members adapted to engage under the inturned bead at spaced intervals to support said portions and having means for forcing the intermediate portions of the bead outwardly against the skirt of the cap to form lugs from the supported portions and means for holding the blanks upwardly with respect to said sockets while the lug forming members are effective.

17. In a machine of the class described, the combination of a carrier for receiving blanks having a cover part and a depending flange and for successively presenting said blanks to a plurality of tools for forming a closure cap therefrom, a press associated with said carrier, a tool carried by said press for forming a hollow inturned bead, a second tool carried by said press for moving together in a vertical direction the upper and lower parts of said bead so as to form a flat bead and a third tool carried by said press having expandible members for supporting the vertically flattened bead at spaced intervals and having intermediate members adapted to fold the flattened bead against the skirt of the cap to form lugs from the supported portions, said third tool having means for moving said expandible members outwardly and inwardly with respect to the skirt of the cap.

18. In a machine of the class described, the combination of means for successively presenting a blank, having a cover part and a depending flange, to a plurality of tools for forming a lug type closure cap from the blank, a press associated with said means, a tool carried by said press for forming a hollow inturned bead in the flange of the blank, and a second tool carried by said press for squeezing the hollow bead together about the circumference of the blank and in a vertical direction so as to form a substantially flat bead.

19. In a machine of the class described, the combination of a rotatable table for presenting a blank, having a cover and a depending flange, to tools for forming a closure cap from the blank, means for rotating said table intermittently, a press above said table, a tool carried by said press for forming a hollow inturned bead in the flange of the blank, a second tool carried by said press for squeezing the hollow bead together about the circumference of the blank and in a vertical direction so as to form a substantially flat bead, and a third tool carried by said press for subsequently forming container engaging lugs from the flattened bead.

20. In a machine of the class described, the combination of a rotatable table, a plurality of matrices on said table for receiving closure blanks having cover parts and depending flanges adapted to be formed into closure caps, each of said matrices having a movable side wall part and a movable bottom part, a press carrying a plurality of tools for performing different forming operations on a blank to form the blank into a closure cap having screw lugs on the interior thereof, and means for raising the bottom parts of said matrices with respect to said table at predetermined positions with respect to each of said tools.

21. In a machine of the class described, the combination of a rotatable table, a plurality of sockets on said table for receiving blanks adapted to be formed into closure caps, said blanks having cover parts with peripheral flanges and said sockets each having a movable sleeve portion comprising the side walls thereof and a movable bottom part, a press carrying tools for forming the blank into a closure cap having screw lugs on the interior thereof, and cam means for moving the side wall sleeve and for raising the bottom part of said sockets with respect to said table at predetermined positions with respect to said tools.

22. In a machine of the class described, the combination of a rotatable table, a plurality of matrices on said table for receiving blanks adapted to be formed into closure caps, said blanks having cover parts and dependent peripheral flanges and each of said matrices having a movable side wall part and a movable bottom part provided with a downwardly depending portion, a press carrying a tool for forming an inturned bead on the flange of the blank and carrying another tool for forming screw lugs from said bead to form a screw closure cap, means for moving the side wall parts of said sockets with respect to the table, and a cam beneath said table for engaging the downwardly depending portion of said movable bottom to raise the bottom part of said matrices with respect to said table.

23. In a machine of the class described, the combination of a rotatable supporting table, a plurality of socket members on said table adapted to receive blanks to be formed into lug type closure caps, said blanks having cover parts and depending flanges, a device having a plurality of tools for reforming the flange of a blank into a beaded edge with spaced screw lugs, said tools being adapted to engage said socket members, cam means for raising said socket members with respect to said rotatable table, and resilient means for supporting said socket members in raised position beneath certain of said tools, said resilient means permitting said socket members to move downwardly when engaged by certain of said tools.

24. In a machine of the class described, the combination of a rotatable table, a plurality of socket members carried by said table, means for presenting substantially cup-shaped blanks to said table adapted to be formed into screw lug closure caps, a resiliently mounted plunger cooperating with said presenting means to seat the blanks in said socket members, devices for turning portions of the edges of said blanks inwardly and forming screw lugs therefrom, mechanism for supporting said plunger and said devices, and means for reciprocating said mechanism substantially perpendicularly with respect to said table to seat the blanks with said plunger and to form the screw lugs with said devices.

25. In a machine of the class described, the combination of a rotatable table, means for rotating said table intermittently, a plurality of socket members on said table, means for delivering cup-shaped blanks to said table adapted to be formed into screw lug closure caps, a resiliently mounted plunger cooperating with said delivering means to seat the blanks in said socket members, devices for turning portions of the free edge of said blanks inwardly and forming screw lugs thereon while in said socket members, and a press for moving said plunger and said devices downwardly in timed relation with the rotation of said table.

26. In a machine of the class described, the combination of a rotatable table adapted to receive substantially cup-shaped blanks for making screw lug closure caps, a press carrying a series of tools, means for moving said press toward and away from said table, a guideway for feeding blanks to said table, a reciprocable member above said guideway, a pawl member pivotally mounted on said reciprocable member effective to engage and move a closure cap along said guideway when the reciprocable member is moved in one direction, a pivotally mounted arm for reciprocating said reciprocable member, a cam movable with said press for moving said arm in one direction, and resilient means for moving said arm in the other direction.

JOHN C. GIBBS.